Dec. 17, 1963  L. A. MEDLAR  3,114,878
FLUID DAMPED ELECTRICAL METER
Filed July 26, 1960  2 Sheets-Sheet 1

INVENTOR.
LEWIS A. MEDLAR
BY
ATTORNEY

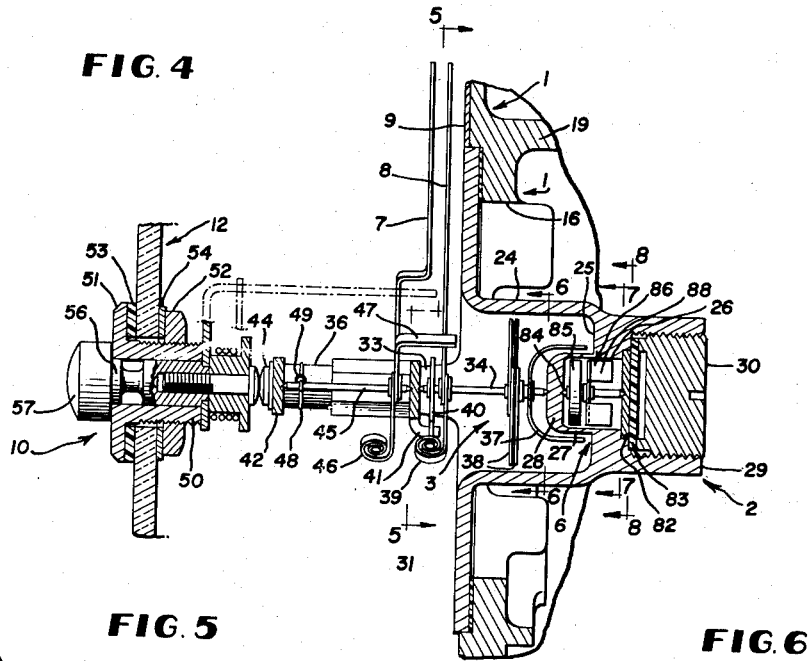

United States Patent Office 3,114,878
Patented Dec. 17, 1963

3,114,878
FLUID DAMPED ELECTRICAL METER
Lewis A. Medlar, Oreland, Pa., assignor to Lewis A. Medlar and Elmer Edkins, Asbury Park, N.J., and B. Franklin Lewis, Flourtown, Pa., trading as Lewis Electrical Equipment Co., Philadelphia, Pa., a copartnership
Filed July 26, 1960, Ser. No. 45,458
12 Claims. (Cl. 324—125)

This invention relates to electrical meters and particularly to meters in which a slow response to variations in the electrical quantity being detected is achieved by fluid damping.

Various uses for electrical meters require that the response of the meter be slowed sufficiently to avoid indication of transient variations in the electrical quantity to which the meter is to respond. One such application is the use of an A.C. ammeter as a load indicator or demand meter to show the maximum load or ampere demand which has occurred at a given point in an electrical power distribution system. Power companies employ distribution transformers of various sizes, attempting to match the transformer to the demand in the particular area involved. Since the demand varies from time to time, it is of course desirable to observe the variations as closely as possible and to shift the transformers from location to location, or to install new transformers when necessary, in order that the size of the transformer in a given location shall always be matched as nearly as possible to the existing demand at that location. While instruments for observing variations in demand have been proposed by workers in the prior art, no such device has ever been widely adopted by the trade and a continuing need for a practical and economical device of this type has existed for many years.

An object of the present invention is to devise a highly effective slow response electrical meter which is sufficiently economical to make its use as a demand meter for example, practical on a commercial basis.

Another object is to provide an improved electrical load indicator or demand meter.

A further object is to provide, in a slow response electrical meter, a highly simplified, inexpensive and easily assembled damping means.

Yet another object is to devise, in such a meter, a damping unit employing a liquid-filled chamber which, while operatively associated with the meter movement, is completely sealed therefrom.

In order that the manner in which these and other objects are attained, in accordance with the invention, can be understood in detail, reference is had to the accompanying drawings, which form a part of this specification, and wherein:

FIG. 4 is a fragmentary axial sectional view similar to FIG. 1 but on a larger scale;

FIG. 5 is a detail view, mainly in front elevation, taken on line 5—5, FIG. 4, with some parts in transverse cross-section and others broken away for clarity;

FIG. 6 is a fragmentary transverse sectional view taken on line 6—6, FIG. 4, with some parts shown in front elevation;

FIG. 7 is a fragmentary transverse sectional view taken on line 7—7, FIG. 4, and FIG. 8 is a fragmentary transverse sectional view taken on line 8—8, FIG. 4.

Figure 1:
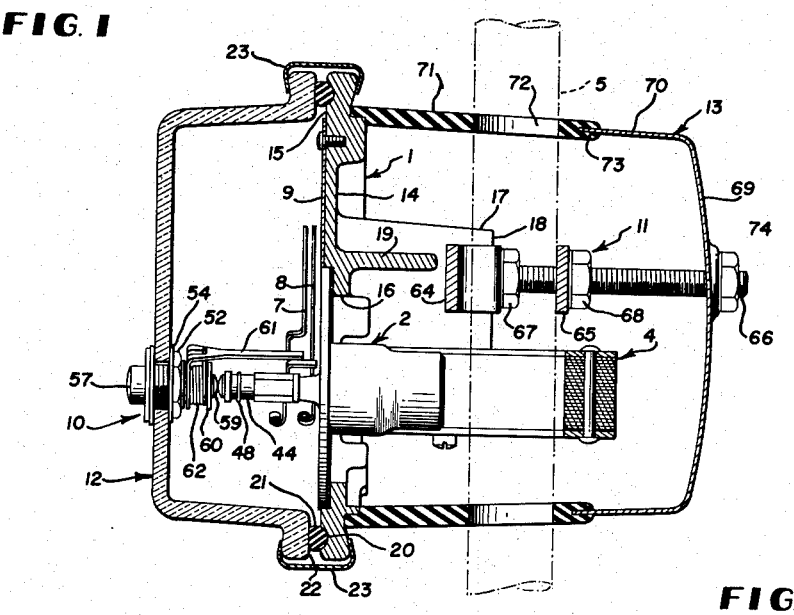
FIG. 1 is an axial sectional view, with some parts shown in side elevation, of a demand meter constructed in accordance with one embodiment of the invention.

Turning now to the drawings in detail, it will be seen that the embodiment of the invention chosen for illustration is an electrical demand meter comprising a frame member 1, a movement housing 2, a movement 3, magnetic field producing means 4 arranged to drive the movement in accordance with current flowing in a conductor 5, movement damping means 6, indicating means including a maximum reading pointer 7 and a present reading pointer 8, both associated with a dial 9, reset means 10 for the maximum reading pointer, a clamp 11 for mounting the meter on conductor 5, a transparent front cover member 12 and a rear cover member 13.

Frame member 1 comprises a circular main body 14 having a flat front face 15 and a circular opening 16, the opening being offset downwardly from the center of the member, as the member is viewed in the drawings, so as to provide sufficient space to accommodate dial 9, the latter being secured to the face 15 by screws. At its rear face, frame member 1 is provided with a pair of rearwardly extending projections 17 formed integrally with the main body of the frame member and disposed each on a different side of opening 16. Projections 17 have flat rear faces 18, FIG. 1, extending parallel to the plane of face 15. A strengthening rib 19 extends between projections 17 above opening 16.

Adjacent its periphery, frame member 1 is provided with a circularly extending, forwardly opening groove 20 accommodating a ring gasket 21. Front cover member 12 is cup-shaped and has an annular lip 22 held in sealing engagement with gasket 21 by a clamping ring 23.

As best seen in FIG. 4, movement housing 2 comprises a cup-shaped main portion including a cylindrical side wall 24 and a transverse wall 25 provided with a cylindrical bore 26. The front end of bore 26 is closed by a forwardly projecting cup-shaped structure formed integrally with wall 25 and including cylindrical wall 27 and transverse wall 28, wall 27 being coaxial with respect to wall 24. Wall 25 is of substantial thickness and an annular, interiorly threaded body 29 extends rearwardly therefrom to receive a threaded closure plug 30.

Thus, walls 24 and 25 define a forwardly opening chamber in which movement 3 is housed, while walls 27 and 28, in combination with bore 26, define a cylindrical chamber in which damping means 6 is housed, this latter chamber being closed by plug 30 as hereinafter described.

At the forward end of wall 24, housing 2 is provided with a transversely extending annular flange 31 seated in a circular notch in frame member 1 and secured to the frame member, as by means of screws 32, FIG. 5. A pair of forwardly projecting mounting bosses 33 are provided on flange 31 in such fashion as to be aligned diametrically across the open mouth of the cup-shaped chamber defined by walls 24, 25.

Frame member 1, including portions 17 and 19, is formed as a rigid integral non-magnetic member. Similarly, movement housing 2, including wall portions 24, 25, 27 and 28, body 29, flange 31 and bosses 33, is formed as a rigid, integral non-magnetic unit. Thus, for example, both the frame member and the movement housing can be made by die casting from a suitable aluminum alloy.

The front face of wall 28 is provided with a centrally located bearing depression receiving the rear end of arbor 34 of movement 3. The front tip of the arbor is disposed in a bearing depression on a pivot bearing plate 35 secured to bosses 33, as by the threaded tips of studs 36. Thus, wall 28 and plate 35 coact to support the arbor for rotation on an axis extending axially through the chamber defined by walls 24, 25. Adjacent wall 28, there is secured on the arbor a suitable bushing to which a U-shaped magnetic bar 37 is fixed, as by staking. The magnetic bar 37 has end portions which, as seen in FIG. 4, extend parallel to but are spaced slightly from the outer surface of wall portion 27. In this regard, the end portions of bar 37 are advantageously curved transversely to match the cylindrical curvature of wall portion 27. A second bushing is fixed to arbor 34 immediately in front of bar 37 and carries four thin circular magnetic vanes 38. The vanes are identical in size and shape and are each provided with a circular opening offset radially from the center of the vane, the supporting bushing extending through all of said openings, the vanes being staked or otherwise secured to the bushing. Before being so secured, the vanes are adjusted rotationally on the bushing so that the first and third of the series of four vanes extend mainly from one side of the arbor 34 while the second and fourth vanes extend mainly from the opposite side of the arbor, as will be clear from FIGS. 4 and 6. Accordingly, the assembly of vanes 38 constitutes a magnetic unit which is effectively elongated in a direction diametrically of the arbor so that, if a magnetic field is established transversely across the arbor, the vane assembly will tend to align itself with such field and, being fixed to the arbor, will tend to rotate the arbor accordingly.

The present reading pointer 8 is secured in the usual fashion to arbor 34 at a point between flange 31 and plate 35 and extends radially from the arbor in front of scale 9, the pointer being provided with a balancing tail at 39, as is well known in the art. Movement 3 is biased to an initial down-scale position by a spiral spring 40, the inner end of the spring being attached to arbor 34 in any suitable fashion and the outer end of the spring being in engagement with a retaining ear 41 on bearing plate 35, as seen in FIG. 4.

Spaced forwardly from plate 35, and disposed in parallel alignment therewith, is a second bearing plate 42. Plate 42 is mounted on studs 36, as by screws 44. An arbor 45 is bearinged in pivot bearing depressions provided respectively on the front surface of plate 35 and the rear surface of plate 42, arbor 45 being aligned coaxially with arbor 34. The maximum reading pointer 7 is fixed to arbor 45 in the usual fashion and extends radially therefrom in such fashion as to move, in a plane parallel to dial 9 and located in front of pointer 8, as arbor 45 turns. Pointer 7 is provided with a balancing tail 46 and a finger 47, the latter projecting parallel to the arbors into a position to be engaged by pointer 8 as pointer 8 moves up-scale.

The studs 36 are disposed each on a different side of arbor 45 and are each provided with a cylindrical front end portion about which is secured an end of a friction cord 48. Friction cord 48 extends for at least one full turn about arbor 45 and is held in tension by a coil spring 49, FIG. 4, interposed in the cord. The frictional effect of cord 48 on arbor 45 is sufficiently small to allow the arbor to turn, and pointer 7 to move up-scale, when pointer 8 is driven up-scale by the meter movement, but, on the other hand, is adequate to maintain arbor 45 and pointer 7 in the up-scale position when pointer 8 swings down-scale.

The reset means 10 is designed for manual operation from outside of front cover member 12 and comprises a hollow sleeve 50 projecting through an opening in the cover member, the sleeve being provided at its outer end with a head 51 and being threaded exteriorly at its inner end for cooperation with nut 52. Sealing gasket 53 is disposed between head 51 and the outer face of member 12. A washer 54 is located between nut 52 and the member 12 and includes a laterally disposed, rearwardly projecting extension forming a detent finger 55, FIG. 3. Sleeve 50 and washer 54 are thus rigidly mounted on front cover member 12 by clamping action between head 51 and nut 52.

Figure 2:
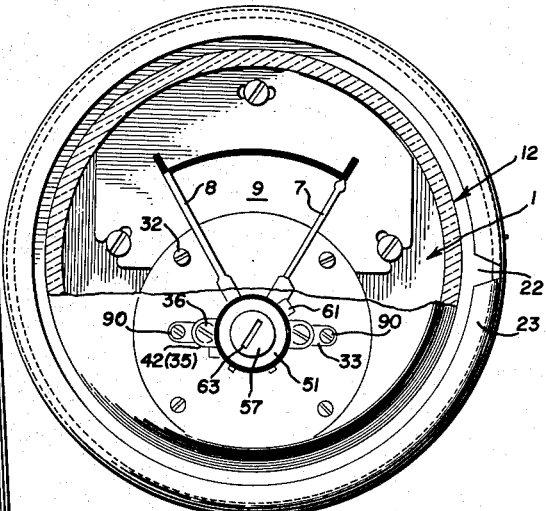
FIG. 2 is a front elevational view of the meter of FIG. 1 with part of the casing broken away for clarity of illustration.

Rotatably disposed in the bore of sleeve 50 is an actuating shaft 56 including a forwardly exposed knob 57, an annular groove 58 to receive a suitable material for effecting a seal between the shaft and sleeve, and a threaded, rearwardly opening bore in which is engaged a screw 59. Screw 59 is provided to support a hub 60. A reset finger 61, projecting radially outward and then rearwardly to engage the up-scale edge of pointer 7, as best seen in FIG. 1, is fixed to the tip of shaft 56. A torsion spring 62 extends helically around the outer cylindrical surface of hub 60 and has its ends extended respectively into engagement with detent finger 55 and reset finger 61 in such fashion as to normally bias the finger 61 in an up-scale direction, out of engagement with pointer 7. Knob 57 is provided with a screw-driver slot 63, FIG. 2, to allow shaft 56 to be rotated against the biasing force of spring 62 to return pointer 7 to zero after a reading has been taken.

Figure 3:
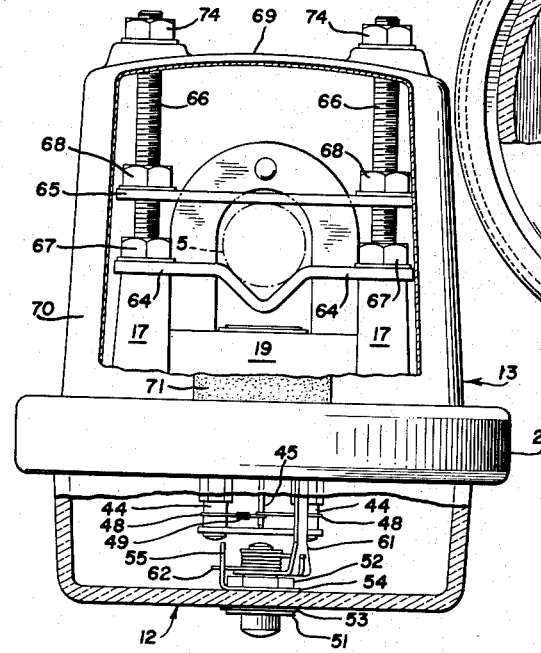
FIG. 3 is a side elevational view of the meter of FIG. 1, with portions of the casing broken away for clarity.

As best seen in FIG. 3, clamp means 11, by which the meter is attached to conductor 5, comprises a fixed clamping bar 64 bent into a V at its center to receive conductor 5, a second clamping bar 65, and threaded studs 66. Studs 66 are fixed each in one of the projections 17 of frame member 1 and extend rearwardly therefrom in mutually parallel relation. Bar 64 is provided with an opening at each end, through which openings studs 66 project, and the bar 64 is secured against the straight rear faces of projections 17 by nuts 67 threaded on the studs. Bar 65 also has an opening in each end, studs 66 extend through such openings, and bar 65 is urged against conductor 5, clamping the same in the V-shaped center portion of fixed bar 64, by nuts 68 threaded on the studs. Thus, clamp means 11 serves as means effective for mounting the meter on conductor 5 and it will be obvious that, when conductor 5 is an elevated power line, the meter can be so positioned as to be readable from the ground, using binoculars when necessary, and that, when the meter is so mounted, the reset means can be manipulated manually by means of a suitable extension tool.

Back cover member 13 is generally cup-shaped, including a rear wall 69, a frusto-conical side wall 70 and a circular front edge. Two elongated notches are provided in side wall 70 at transversely aligned points, the notches being of such width and depth as to accommodate conductor 5, both notches opening into the circular front edge of member 13, as will be clear from FIGS. 1 and 3. Each such notch is closed by a grommet 71 having an opening 72, through which conductor 5 passes, and a peripheral groove 73, FIG. 1, in which the edge portions of the corresponding notch in member 13 are engaged. Grommets 71 are each slit from opening 72 forwardly to allow entry of conductor 5 into openings 72. The rear wall 69 of member 13 is provided with openings through which studs 66 extend, and member 13 is clamped against frame member 1 by nuts 74 threaded on the studs.

Referring now to FIGS. 1, 3 and 6, it will be seen that the magnetic field producing means 4 comprises a stacked series of horse shoe-shaped magnetic laminae 75 secured together to form a laminated magnetic structure 76 including top and bottom face plates 77 and 78, respectively, and fasteners 79. The parallel legs of the magnetic structure 76 are of such length, and the curved base of such extent, that the unit can embrace conductor 5 and have its ends disposed each on a different side of the chamber defined by wall portions 24, 25 of movement housing 2. When the laminated magnetic structure is positioned in this manner, current flow in conductor 5 will generate magnetic flux in the laminated magnetic structure and so establish a magnetic field extending between the end portions of the legs of the U-shaped structure. Such magnetic field extends transversely across the chamber defined by wall portions 24, 25 in the area of the meter movement 3 and is effective to drive the meter movement.

From FIG. 6, it will be noted that the ends of the legs of the magnetic structure 76 are disposed between projections 17 of frame member 1, each leg being adjacent a different one of projections 17. Mounting of structure 17 is accomplished by providing ears 80 on bottom face plate 78, each ear 80 extending in face-to-face contact with the bottom edge of the corresponding projection 17 and being secured thereto by a screw 81.

At its rear face, at the mouth of bore 26, wall 25 is provided with a pair of diametrically opposed notches in which are seated the ends of a bearing bar 82. A circular gasket 83 overlays the bar 82 and the rear face of wall 25 and the combination of bar 82 and gasket 83 is clamped in place by plug 30, the gasket sealing the chamber defined by walls 27 and 28 and bore 26, as shown in FIG. 4.

The rear face of wall 28 and the front face of bar 82 are each provided with a bearing depression, and an arbor 84 has its ends engaged respectively in such depressions, the depressions being centered in such fashion that arbor 84 is disposed in axial alignment with arbor 34. Adjacent wall 28, there is fixed to arbor 84 a diametrically magnetized circular disc magnet 85. Immediately behind magnet 85, a vaned rotor 86 is also fixed to the arbor 84. As seen in FIG. 7, rotor 86 includes a flat main body 87 lying transversely of arbor 84 and a pair of flat vanes 88 lying in planes parallel to the axis of arbor 84. The two halves of body 87 are identical. Vanes 88 are identical and are disposed in identical positions opposed across arbor 84. Magnet 85 and rotor 86 are centered on the arbor. Thus, the assembly comprising arbor 84, magnet 85 and rotor 86 is rotationally balanced, statically and dynamically, about the axis of arbor 84.

Magnet 85 is located between the ends of U-shaped magnetic bar 37, the wall 27 being thin and the space between the periphery of the magnet and the ends of bar 37 being relatively small, so that a good magnetic coupling is established between bar 37 and the magnet. Accordingly, when movement 3 turns, its rotational movement is transmitted to the rotary assembly, comprising elements 84, 85 and 86, of damping means 6. The chamber defined by walls 27 and 28 and bore 26 is filled with a viscous damping liquid, advantageously a silicone oil, to provide substantial resistance to rotation of rotor 86. Considering the magnitude of the rotational forces involved, the magnetic coupling comprising elements 37 and 85 constitutes a direct driving connection between arbors 34 and 84. Hence, when current flows in conductor 5, so that a magnetic field is established across movement 3 and a rotational force is accordingly applied to the movement, such force is resisted by the viscous liquid surrounding vaned rotor 86. As a result of such resistance, transient surges in current result in little or no rotation of movement 3 and therefore little or no movement of pointers 8 and 7. However, a prolonged change in the current in conductor 5, reflected in a prolonged change in the magnetic field applied by means 4 across the meter movement, results in gradual rotation of the meter movement to bring the longer diametrical dimension of the assembly of vanes 88 more in alignment with the magnetic field. Such gradual turning of the movement is permitted because of the gradual turning of rotor 86 in the surrounding viscous liquid.

Referring to FIG. 4, it will be noted that the vanes 88 are elongated axially of the chamber of the damping means and extend for a major portion of the space between magnet 85 and bearing bar 82. Thus, considering the size of the damping chamber, the vanes 88 each have a large area facing in the direction of rotation of the rotor so that, for the allowable size of the parts, damping means 6 provides a maximum resistance against rotational movement of the arbor 34.

Any up-scale movement of present reading pointer 8, resulting from rotation of arbor 34 in the up-scale direction, is imparted to maximum reading pointer 7, since pointer 8 engages finger 47. If, after an up-scale movement of the pointers, arbor 34 turns in a down-scale direction, pointer 7 simply remains in that position to which it was moved by pointer 8, arbor 45 being frictionally restrained by spring-tensioned cord 48. Accordingly, it will be clear that, until pointer 7 is returned to its down-scale position by manual operation of re-set means 10, that pointer remains in a position, relative to dial 9, indicating the maximum value of the electrical quantity being measured which has occurred since last re-setting of the meter.

Extending rearwardly through each boss 33 is a screw 90 threadably engaged within a suitable bore and projecting rearwardly from a flange 31. Each screw 90 is aligned with a different one of the legs of the magnetic structure 76. Thus, when the magnetic structure 76 is mounted as hereinbefore described, and prior to tightening of screws 81, the legs of the magnetic structure can be brought into engagement with the tips of the corresponding screws 90. Accordingly, screws 90 constitute stops to determine the relative position of the magnetic structure 76 with respect to the meter movement. With this arrangement, it is possible to provide several magnetic structures 76, all identical in size and shape but having different predetermined magnetic characteristics. Once the meter has been assembled with one such magnetic structure and the screws 90 have been adjusted to establish the proper position for the magnetic structure, the operating range of the meter can be changed simply by substituting a selected one of the several magnetic structures.

Attention is called to my co-pending application Serial Number 45,460, filed concurrently herewith, wherein highly over damped, balanced meter movements of the type herein discussed are described in detail and claimed.

I claim:

1. In a slow response electrical meter, the combination of a meter movement including an arbor and means mountaing said arbor for rotary movement about its axis; means defining a sealed chamber adjacent one end of said arbor, said chamber being filled with a viscous damping material; a second arbor disposed wholly within said sealed chamber and mounted for rotary movement about its axis, said arbors being axially aligned; a damping rotor fixed to said second arbor and immersed in said viscous material; and drive means interconnecting said arbors and operative to transmit rotational forces therebetween through a wall of said chamber, said drive means comprising a permanent magnet rotor fixed to one of said arbors and magnetized transversely thereof, and a magnetic member fixed to the other of said arbors and having portions closely adjacent to said wall of said chamber to cooperate magnetically with said permanent magnet rotor.

2. In a slow response electrical meter for indicating the maximum load which has occurred at a power distribution transformer, the combination of a magnetic field-responsive meter movement including an arbor and means mounting said arbor for rotation about its axis;

means operative to produce a magnetic field proportional to current flow from the distribution transformer for driving said meter movement; means defining a sealed chamber adjacent one end of said arbor, said chamber being filled with a viscous damping material; a damping rotor; a second arbor, said damping rotor being carried by said second arbor for rotation about the axis of said second arbor, said second arbor and said damping rotor being disposed wholly within said chamber and immersed in said viscous material; rotary motion transfer means coupling said first-mentioned arbor to said rotor, whereby operation of said meter movement by such magnetic field is resisted by the damping effect of said viscous material on said rotor, and a maximum reading indicator operatively connected to said meter movement for actuation thereby, said motion transfer means comprising a permanent magnet rotor fixed to said second arbor and magnetized transversely thereof and a magnetic member fixed to said first-mentioned arbor and located wholly outside of said chamber, said magnetic member having portions disposed closely adjacent said chamber to cooperate magnetically with said permanent magnet rotor.

3. In a slow response electrical meter, the combination of means defining a closed and sealed cylindrical chamber; a first arbor disposed coaxially within said chamber and mounted for rotation about its axis; a permanent magnet fixed to said arbor and centered thereon, said magnet being magnetized diametrically with respect to said arbor and having pole portions disposed closely adjacent to the cylindrical wall of said chamber; a vaned damping rotor fixed to said arbor and including at least one pair of vanes opposed across said arbor and facing generally in the direction of rotation thereof, said chamber being filled with a viscous damping material capable of resisting rotational movement of said rotor; a meter movement mounted outside of said chamber and including a second arbor axially aligned with said first arbor; a magnetic member fixed to said second arbor adjacent an end of said chamber and including end portions extending axially of said chamber closely adjacent to the outer surface of the cylindrical wall thereof, said permanent magnet being located between said end portions of said magnetic member and said permanent magnet and said magnetic member constituting a magnetic coupling between said arbors, and means for driving said meter movement against the damping effect afforded by said rotor.

4. In a slow response electrical meter, the combination of a support member formed as an integral unit from non-magnetic material and including a hollow portion, a supporting wall extending transversely of said hollow portion, and a cup-shaped portion carried by said wall, said cup-shaped portion projecting into said hollow portion and terminating in an end wall extending transversely of said hollow portion; closure means sealing the end of said cup-shaped portion opposite said end wall, said cup-shaped member and closure means defining a sealed chamber and said chamber being filled with a viscous damping material; a damping rotor disposed in said chamber and mounted for rotation about an axis extending at right angles to said end wall; a meter movement disposed in said hollow portion and including an arbor rotatably mounted with its axis aligned with the axis of rotation of said damping rotor; magnetic coupling means rotatably coupling said arbor and said damping rotor through the wall of said cup-shaped portion, and means for driving said meter movement against the restraining effect afforded by said damping rotor.

5. A meter in accordance with claim 4 and wherein said hollow portion surrounds said meter movement and is provided with a mounting flange at its end opposite said supporting wall.

6. A meter in accordance with claim 4 and further comprising a pivot bearing member extending across said hollow portion and spaced from said end wall of said cup-shaped portion, said bearing member and said end wall being provided with aligned bearing depressions and said arbor having its ends each engaged in a different one of said bearing depressions.

7. A meter in accordance with claim 6 and further comprising a second pivot bearing member spaced from said first-mentioned bearing member on the side thereof opposite said meter movement, a second arbor rotatably carried by said bearing members in axial alignment with said first arbor, a present reading pointer fixed to said first arbor, a maximum reading pointer fixed to said second arbor and arranged to be moved by said present reading pointer, and frictional means connected to said second arbor to brake the same.

8. In a slow response electrical meter, the combination of a non-magnetic integral support member comprising a larger cup-shaped portion and a smaller cup-shaped portion facing in opposite directions, said smaller cup-shaped portion projecting from the bottom wall of said larger portion into the interior thereof and having its bottom wall disposed transversely of said larger portion, the bottom wall of said larger portion having an opening communicating with the interior of said smaller portion, said support member being provided at the mouth of said larger portion with an annular outwardly projecting mounting flange; a pivot bearing member extending across the open mouth of said larger portion and secured to said flange, said bearing member and said bottom wall of said smaller portion being provided with aligned bearing depressions; a meter movement disposed in said larger portion and including a first arbor, said arbor having its ends engaged each in a different one of said depressions; means closing said opening in the bottom wall of said larger portion and thereby completing a sealed damping chamber, said chamber being filled with a viscous damping material; a second arbor rotatably mounted in said damping chamber in axial alignment with said first arbor; a damping rotor fixed to said second arbor, and magnetic means coupling said arbors through the wall of said smaller portion.

9. A meter in accordance with claim 8 and wherein said magnetic means comprises a permanent magnet fixed to said second arbor and magnetized diametrically with respect thereto, said magnet having pole portions disposed adjacent the side wall of said smaller cup-shaped portion, and a magnetic member fixed to and extending transversely of said first arbor and having parallel end portions extending axially of said arbors adjacent the outer surface of the side wall of said smaller portion, said magnet being located between said end portions.

10. A meter in accordance with claim 8 and further comprising a frame plate having an opening, said larger cup-shaped portion being located in said opening and said flange being secured to said frame plate, and means for driving said meter movement comprising a generally U-shaped laminated magnetic member mounted on said frame plate and having its ends located each on a different side of said larger cup-shaped portion.

11. In a slow response electrical meter, the combination of a meter movement including an arbor and means mounting said arbor for rotary movement about its axis; means defining a sealed chamber adjacent one end of said arbor, said chamber being filled with a viscous damping material; a second arbor disposed wholly within said sealed chamber and mounted for rotary movement about its axis, said arbors being axially aligned; a damping rotor fixed to said second arbor and immersed in said viscous material; and drive means interconnecting said arbors and operative to transmit rotational forces therebetween through a wall of said chamber, said drive means comprising a magnetic coupling including a diametrically magnetized disc fixed to said second arbor and a magnetic member fixed to said first arbor.

12. A meter in accordance with claim 11 and wherein said means defining said sealed chamber includes a thin cylindrical wall concentric with said arbors, the periphery of said disc being closely adjacent to the inner surface of said wall, said magnetic member having end portions closely adjacent to the outer surface of said wall at diametrically opposed points, said end portions facing the periphery of said disc.

References Cited in the file of this patent

UNITED STATES PATENTS

| | | |
|---|---|---|
| 1,515,634 | Vawter | Nov. 18, 1924 |
| 2,295,959 | Melville | Sept. 15, 1942 |
| 2,355,237 | Pethes | Aug. 8, 1944 |
| 2,622,707 | Faus | Dec. 23, 1952 |